June 12, 1923.                                                     1,458,376
E. ANDERSON
METHOD OF MAKING CERAMIC PRODUCTS
Filed Aug. 21, 1919
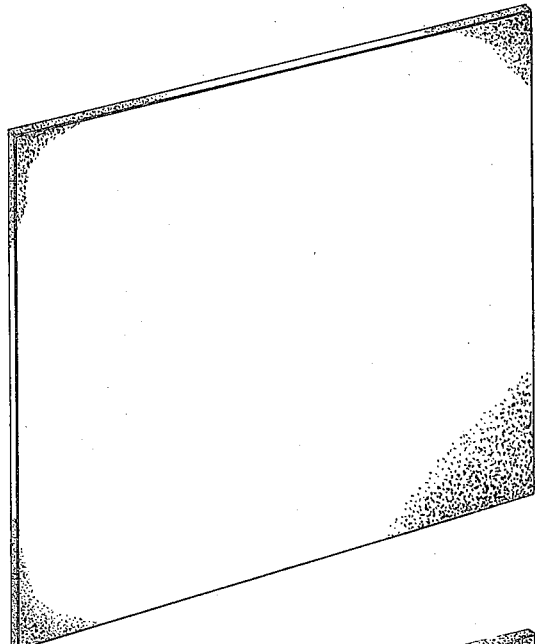
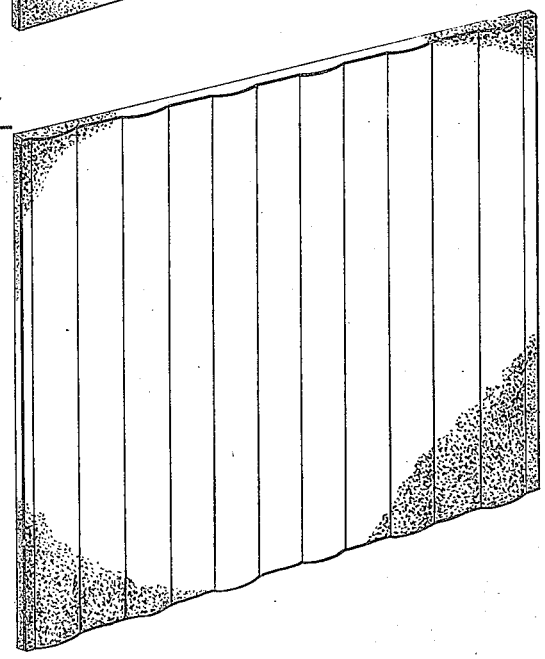

Patented June 12, 1923.

1,458,376

UNITED STATES PATENT OFFICE.

EDWARD ANDERSON, OF DAYTON, OHIO, ASSIGNOR, BY MESNE ASSIGNMENTS, TO THE A. A. SIMONDS-DAYTON COMPANY, OF DAYTON, OHIO, A CORPORATION OF OHIO.

METHOD OF MAKING CERAMIC PRODUCTS.

Application filed August 21, 1919. Serial No. 318,910.

*To all whom it may concern:*

Be it known that I, EDWARD ANDERSON, a citizen of the United States, residing at Dayton, Montgomery County, Ohio, have invented certain new and useful Improvements in the Methods of Making Ceramic Products, of which the following is a full, clear, and exact description.

My invention relates to the art of making ceramic products, its purposes and advantages being fully set forth and described in the following specification:

Although my method of making ceramic products is applicable to various branches of the ceramic art, and has been found especially useful in making ceramic separators for the plates of storage batteries, its advantages are so well exemplified in connection with the making of abrading wheels, an art that has long contended with certain problems which my method solves, I will first describe the method as applied to that art. Among these problems is that of making vitrified wheels of very thin cross section. The usual method of making vitrified wheels is to mix with the granular abrasive material, which is the basic element of the wheel, a vitreous bonding material, molding the mixture into the desired form and baking or firing it in a kiln at a temperature sufficiently high to fuse or vitrify the bonding material, which acts as a cement to bind the mixture into a solid mass of great mechanical strength. Before firing, this composition or mixture is very fragile; it may even be described as tender, and for this reason there has always been considerable loss through breakage or mutilation of the wheels in the handling which they are necessarily subjected to before the firing begins. Various expedients have been tried for eliminating or even reducing this loss, but with only partial success. In making the very thin wheels that the grinding art now demands the loss is very great, even as much as eighty-five percent in some cases. Furthermore, the extreme fragility of the raw composition has been found to impose a practical limit on the thinness of the product.

In order to overcome the difficulty and eliminate the losses described, which of course occur in making all kinds of ceramic products, and also enable the wheelmakers to meet the demand for still thinner wheels, I conceived the idea of using a temporary bond to give greater strength to the composition in its transitory stage. After much experimentation I have found a phenol resin the most satisfactory material for the temporary bond, although there are other resins, and even other substances that answer the purpose more or less well. The resin volatilizes and is dissipated before the temperature has risen to the point necessary for the fusion of the vitreous bonding material, leaving the mass unaffected by its temporary presence, except in certain particulars which will be hereinafter described.

The temporary presence of the resin increases the mechanical strength of the product, as will appear presently. The basic material is granular, the grains, though more or less uniform in size, being irregularly formed bodies bounded by variously shaped facets. In a quantity of such material the grains contact with each other principally at corners and the smaller facets, which results in there being interstices of various shapes and sizes between the grains. When the basic and bonding materials, in proper proportions, are thoroughly mixed together, dry, the bonding materials being pulverized, preferably, the grains assume substantially the same relation to each other as they would in the absence of the bonding material, contacting with each other at their corners and small facets, the bonding materials, including the resin, occupying the interstices between the grains. In making products by my method I mix the basic and bonding material and the desired quantity of resin thoroughly, in a dry state, and place the mixture in a mold, where it is subjected to pressure and heated sufficiently to liquefy the resin. It is then cooled and removed from the mold. The resin acting as a cement unites the mass into a solid body having sufficient strength to enable the article to be handled with comparatively no danger of its being injured. Not only is the loss from breakage thus eliminated, but the cost of handling is very much reduced by reason of the superior strength of the articles. While it may be found desirable to vary the pressure to meet certain conditions, I have found a pressure of one thousand pounds to the square inch satisfactory.

The articles are embedded in quartz sand and placed in the kiln in the usual way, where the heat is raised slowly to the point necessary for fusing the vitreous bonding material. At 350° F., or thereabouts, the resin liquefies and it volatilizes in the neighborhood of 1200° F. During the interval between its liquefaction and volatilization the resin performs a very useful function: under the influence of capillary attraction it invades the smaller interstices and carries the bonding material with it. That is, the pulverized bonding material floating in the fluid resin goes where the fluid goes. This conflux begins and is probably more or less completed while the mass is in the mold, depending upon the temperature to which the mass is heated. The resin volatilizes gradually and as its volume diminishes it tends more and more to seek the smaller crevices between the grains, the bonding material, which is still in a pulverized state being carried with it, leaving the larger interstices more or less vacant.

One of the properties required of the bond in an abrasive wheel, is that while it must form a union between the grains, of sufficient strength to enable the wheel to withstand the great strain which centrifugal force imposes on it, it must be fragile enough to break down and release the grains of abrasive material as soon as they become dull and more or less useless. Each grain of abrasive is a tool whose function is to cut into the material on which the wheel is operating, and just as soon as the grain gets dull, so that it no longer cuts freely, but generates excessive heat and consumes an undue amount of power, it should be eliminated so as to make room for a fresh grain. The ideal bond is one which will sustain the grain as long as it cuts freely, but break down under the increased strain due to the grain having become dull, the dull grain and the stratum of bond which held it being thrown from the wheel by centrifugal force. On the principle that the strength of a cemented joint is proportional to its thinness; i. e., that a thin layer of cement has greater strength than a thick layer, it is seen that by filling all of the smaller crevices and interstices with the bond, thus cementing the grains together with thin but dense layers of cement the wheel is given greater strength without increasing the inherent strength or the quantity of the bonding material. The bonding material does not become fluid when it is fused; at most it attains a viscous, ropy consistency, and is substantially immobile. Therefore, unless it is concentrated in the smaller interstices before it is fused it will not get there, as there is nothing to take it there. It occupies the large and small interstices indiscriminately, and when fused it simply remains where it is. This results in the bond assuming a tenuous, sponge like character. In order to get a given strength, it requires more bonding material where it is distributed indiscriminately through the mass than where it is confined to the smaller interstices, which, by increasing the weight of the wheel increases the strain on the bond when the wheel rotates. It also reduces the porosity of the composition. I have found the following materials and proportions satisfactory for certain purposes, but it is not to be understood that I limit myself to these:

|  | Parts. |
|---|---|
| Granulated aluminous oxide | 1000 |
| Vitreous clay | 400 |
| Phenol resin | 54 |

By varying the proportions of bonding material and resin the wheel may be made more or less porous; the porosity of the product is also made more uniform by the presence of the resin, because of the bond being confined to the smaller interstices, leaving the larger spaces more or less vacant, according to the quantity of bond used. Furthermore, it is possible to reduce the bonding material to a quantity which would be impracticable in the old method. If it is true that a wheel of maximum strength is obtained by filling all of the smaller interstices with bonding material, and that the material in the larger spaces is comparatively useless so far as giving strength to the wheel is concerned, it is evident that wheels of greater porosity can be produced by my method than by the old one. It is to be understood, of course, that the porosity is greater with large than small grained basic material. Porosity is a very desirable quality in an abrasive wheel, particularly for grinding certain materials, its function being analogous to the clearness which is always given to cutting tools. The pores afford spaces for the temporary lodgment of particles of material cut off by the wheel, as well as grains of abrasive and particles of bond as it breaks down, and help to keep down the heat.

I shall now describe the application of my method, to the making of caramic separators for storage battery plates, thereby illustrating its great flexibility and adaptability to particular requirements.

In the accompany drawing, Fig. 1 shows a virtrified separator for battery plates, made by my method, in which both sides are plane surfaces; Fig. 2 shows a separator in which one side is a plane surface and the other side has ribs.

A battery separator should interpose a strong mechanical barrier between the battery plates, capable of preventing the plates "buckling", i. e., becoming distorted when the battery is discharged at a high rate, and which will prevent detachment of particles of lead oxide from the positive plate and their conversion into metallic lead. At the same time it must impede as little as possible the electrolytic action of the cell. Heretofore thin sheets of wood have been found to answer these rather conflicting requirements better than any other substance that has been tried, the wood having some mechanical strength and being porous enough to permit a reasonably free electrolysis. But the wood is admittedly deficient in both of these requirements. It does not have the desired mechanical properties and, furthermore, it deteriorates rapidly in the battery and requires frequent renewal. On the other hand, its porosity is deficient, which results in the internal resistance of the battery being too high, this in turn not only causing loss of energy and lowering the efficiency of the battery, but lowering the current rate at which the battery can be discharged, making it necessary to use a larger and therefore heavier battery to obtain a given output of energy than would be necessary if the internal resistance of the battery were lower.

My vitrified separators meet both of these requirements. They have an abundance of mechanical strength and the required insulating or dielectric qualities. They suffer no deterioration whatever while in the battery and need never be renewed. On the other hand their great porosity facilitates electrolysis, and batteries equipped with them have a very low internal resistance. I prefer separators having plane surfaces on both sides, as they confine the lead oxide and prevent disintegration of the plates. As a battery discharges there is a tendency for particles of lead oxide to detach themselves from the positive plate, and these particles then turn to metallic lead and gravitate to the bottom of the cell. This disintegration or decomposition, which gradually dissipates the active element of the plate, is prevented by the flat surface of the separator lying in intimate contact with the plate. The porosity of the separator permits this confinement of the oxide without in any degree impairing the action of the battery. I show the ribbed separator simply to satisfy any who might be disposed to oppose the plane surface separator.

The porosity of the separators is the result of the interstices between the grains of the granular basic material of which they are made being more or less connected, so as to form a system of tortuous pores or foramina extending through the separator from one side to the other. Attempts have been made to use separators made of hard rubber and other substances having perforations drilled or otherwise made through them. These have failed because of the formation of metallic lead in these direct apertures, which ultimately "short-circuits" the plates. The indirectness of the pores in my separators, together with their diminutiveness, prevents the formation in them of these outgrowths of metallic lead. Even if such growths should begin they would necessarily become so attenuated that they could not penetrate the separator far, to say nothing of reaching the other side. The pores are so small that they leave practically no particle of the oxide free to become detached from the plate, but they are so numerous as to permit almost unimpeded electrolysis. The size of the pores may be varied by varying the size of the grains of basic material; also by varying the quantity of the vitreous bonding material. These things may be so co-ordinated to the thickness of the separators, that a uniform internal resistance may be established and maintained for all sizes of batteries. In fact, the control which may be exercised over the porosity and other physical characteristics of these separators is a very valuable feature of my invention. My separators may be made of any size and thickness required. While, as I have said before, they do not deteriorate by use, if it should be found that their porosity has become impaired from an accumulation in their pores of sediment or any other matter, they may be cleaned and restored to their full and original efficiency by being heated to a red or even white heat, which, because of their refractory nature may be done with impunity. It is to be understood, however, that there is nothing about my separators which renders them more subject to impairment than others, for on the contrary they are much less liable to be affected by extraneous causes. Being composed of refractory minerals they are practically indestructible and will outlast not only the first but successive sets of battery plates.

In making abrading wheels granulated aluminous oxide is commonly used, frequently under various trade names, as the basic material. For the bonding material various vitreous clays are used, these being well known to those engaged in the art. I have found these same materials excellent for separator plates, but it is not to be understood that I confine myself to them. Nor is it necessary that the basic material be of the class of abrasives. Other materials having the qualities needed in separators may be used. And so it is with the application of my method to other branches of the ceramic art. I believe my method to be unique, and have described it at considerable length, giving two examples of its application in fields remote from each other; and those who are skilled in the ceramic art will readily find means for applying the method to other uses to which it is appropriate. But I wish to mention, briefly, one other application, namely, filtering plates. The control which my method gives over the porosity of ceramic products, both in degree and uniformity, makes it particularly advantageous in making filtering plates. Vitrified filtering plates have a marked advantage over other types, in that they are refractory and may be renewed and purified by fire, which consumes the matter accumulated in their pores without injury to the plates themselves. Not only may plates of extreme porosity be made by my method, but the degree of porosity may be controlled according to the size of grains used, and the proportions of the permanent and temporary bond.

I have stated that other materials than resins may be used in practicing my method. Among these is pulverized celluloid. It is also possible to use two different substances together, one to act as a temporary bond and the other to become the vehicle for carrying the vitreous bonding material into the interstices between the grains. Casein is useful for the first purpose and Kauri gum serves well for the latter, these two substances being of such a nature as will act harmoniously. Other variations in the method, within the scope of my claims, may occur to those skilled in the art now that I have pointed the way.

What I claim is as follows:

1. The method of making ceramic products, which comprises mixing with the materials that are to compose the finished product a volatilizable substance adapted to bind said materials together and maintain the mass in whatever form it is given until after it is deposited in the kiln.

2. The method of making ceramic products, which comprises mixing with the materials that are to compose the finished product a substance adapted to bind said materials together and maintain the mass in whatever form it is given until after it is deposited in the kiln, said substance being of such a nature as to be volatilized and dissipated by the heat of the kiln.

3. The method of making ceramic products, which comprises mixing with the materials that are to compose the finished product a substance adapted to bind said materials together and maintain the mass in whatever form it is given until after it is deposited in the kiln, said substance being of a nature which will be first liquefied and later volatilized by the heat in the kiln.

4. The method of making ceramic products which comprises mixing a granular basic material with a fusible bonding material, and a volatilizable material adapted to temporarily bind the other components together.

5. The method of making ceramic products, which comprises mixing a basic material, a vitreous bonding material and a temporary bonding material together, molding the mixture into the desired form and heating it in a kiln until the vitreous bonding material fuses; the temporary bonding material having the capacity for holding the mass together until it is placed in the kiln, and being of a nature that will be dissipated by the heat of the kiln while the temperature of the mass is still below the fusing temperature of the vitreous bonding material.

6. The method of making ceramic products, which comprises mixing together a granular basic material, a pulverized vitreous bonding material and a temporary bonding material capable of being dissipated by heat below the temperature required for vitrifying the vitreous bonding material; molding said mixture into the desired form, the temporary bonding material being adapted to retain the mass in said form, and heating it in a kiln to a temperature necessary for vitrifying the vitreous bonding material.

7. The method of making ceramic products, which comprises mixing together a granular basic material, a pulverized vitreous material and a resinous material, placing the mixture in a mold, heating it sufficiently to cause the resinous material to bind the mixture together, placing the molded article in a kiln and heating it to a temperature necessary for fusing the vitreous material.

8. The method of making ceramic products, which consists in mixing together a granular basic material, a pulverized vitreous material and a resinous material, placing the mixture in a mold in which it is subjected to pressure, heating the mold sufficiently to melt the resinous material and cause it to unite the mixture into a solid mass, finally embedding the molded mass in sand and depositing it in a kiln where it is heated to a temperature sufficient to vitrify the vitreous material.

9. The method of making ceramic products, which consists in mixing together a granular basic material, a pulverized vitreous material and pulverized phenol resin, placing the mixture in a mold in which it is subjected to pressure and heat sufficient to melt the resin and cause it to unite the mixture into a solid mass, then embedding the molded mass in sand and depositing it in a kiln where it is heated to a temperature sufficient to vitrify the vitreous material.

10. The method of making very thin flat vitrified plates, which consists in mixing together a granular material, a pulverized vitreous material and pulverized resin, placing the mixture in a mold in which it is subjected to pressure, and heat sufficient to melt the resin and cause it to unite the mixture into a solid mass, then embedding the plate in sand and depositing it in a kiln where it is heated to a temperature sufficient to vitrify the vitreous material.

11. The method of making porous vitrified products having a desired porosity which consists in mixing together a granular material, a pulverized vitreous material and a pulverized resinous material, placing the mixture in a mold where it is subjected to pressure, and heat sufficient to melt the resinous material and cause it to unite the mixture into a solid mass, removing the mass from the mold and embedding it in sand in a kiln, where it is heated to a temperature sufficient to vitrify the vitreous material; the vitreous and resinous materials being so proportioned that when the latter volatilizes and is dissipated in the kiln a desired proportion of the interstices between the grains will be void.

12. The method of making ceramic products, which comprises mixing with the materials that are to compose the finished product a substance adapted to bind said materials together and maintain the mass in whatever form it is given until after it is deposited in the kiln, said substance being of a nature which will be first liquefied and later dissipated by the heat in the kiln.

13. The method of making ceramic products which comprises mixing a granular basic material with a fusible bonding material, and a dissipable material adapted to temporarily bind the other components together.

14. The method of making storage battery plate separators, which comprises mixing together a granular basic material, a pulverized vitreous bonding material, and a volatilizable material adapted to temporarily bind the other components together, molding said mixture into the required form and heating it in a kiln to a temperature necessary for vitrifying the vitreous bonding material.

15. The method of making storage battery plate-separators, which comprises mixing with the materials which are to compose the finished separator, a volatilizable substance adapted to bind said materials together until after it is deposited in the kiln, molding the mixture into a thin flat form and firing it in a kiln.

In testimony whereof I affix my signature in the presence of two subscribing witnesses.

EDWARD ANDERSON.

Witnesses:
J. A. WORTMAN,
F. K. FASSETT.